(12) United States Patent
Korcz et al.

(10) Patent No.: US 9,337,635 B2
(45) Date of Patent: May 10, 2016

(54) BOX HANGER CLIP AND ELECTRICAL BOX ASSEMBLY

(71) Applicant: HUBBELL INCORPORATED, Shelton, CT (US)

(72) Inventors: Krzysztof W. Korcz, Grainger, IN (US); Steven J. Johnson, Buchanan, MI (US)

(73) Assignee: HUBBELL INCORPORATED, Shelton, CT (US)

( * ) Notice: Subject to any disclaimer, the term of this patent is extended or adjusted under 35 U.S.C. 154(b) by 64 days.

(21) Appl. No.: 14/264,764

(22) Filed: Apr. 29, 2014

(65) Prior Publication Data
US 2014/0318824 A1  Oct. 30, 2014

Related U.S. Application Data (60) Provisional application No. 61/817,410, filed on Apr. 30, 2013.

(51) Int. Cl.
*H02G 3/08* (2006.01)
*H02G 1/00* (2006.01)

(52) U.S. Cl.
CPC . *H02G 3/08* (2013.01); *H02G 1/00* (2013.01); *Y10T 29/49117* (2015.01)

(58) Field of Classification Search
CPC ....... H02G 3/08; H02G 1/00; Y10T 29/49117

USPC .......................................................... 174/58
See application file for complete search history.

(56) References Cited

U.S. PATENT DOCUMENTS

| | | | |
|---|---|---|---|
| 2,512,188 A | 6/1950 | Wait et al. | |
| 3,892,911 A * | 7/1975 | Codrino | 174/59 |
| 4,362,284 A | 12/1982 | Bolante | |
| 4,898,357 A | 2/1990 | Jorgensen et al. | |
| 5,484,076 A | 1/1996 | Petrushka | |
| 6,389,658 B1 | 5/2002 | Pfaller et al. | |
| 6,956,172 B2 | 10/2005 | Dinh | |
| 7,923,635 B2 | 4/2011 | Korcz et al. | |
| 8,309,849 B2 | 11/2012 | Dinh | |
| 8,382,341 B2 | 2/2013 | Peter | |
| 8,403,277 B2 | 3/2013 | Nuernberger et al. | |
| 2008/0217054 A1 | 9/2008 | Walton | |
| 2010/0288554 A1 | 11/2010 | Jafari | |

* cited by examiner

*Primary Examiner* — Dhirubhai R Patel
(74) *Attorney, Agent, or Firm* — Dickinson Wright PLLC (57) ABSTRACT

A box hanger clip is provided for coupling to an electrical box for supporting the electrical box during use. The box hanger clip has at least one and typically two L-shaped coupling tabs that are received in apertures in a wall of the electrical box and hook to the inner surface of the electrical box. The box hanger clip has a body extending substantially perpendicular from the coupling tabs away from the electrical box where the body is configured for coupling to a support such as a cable. At least one bendable stabilizing tab is provided on the body of the box hanger clip which can be bent out of the plane of the body. The stabilizing tab contacts the outer surface of the electrical box to maintain the box hanger clip in the upright position.

22 Claims, 6 Drawing Sheets

FIG. 19

BOX HANGER CLIP AND ELECTRICAL BOX ASSEMBLY

CROSS-REFERENCE TO RELATED APPLICATION

This application claims the benefit of U.S. Provisional Application Ser. No. 61/817,410, filed Apr. 30, 2013, the entire content of which is incorporated herein by reference.

FIELD OF THE INVENTION

The present invention is directed to a box hanger clip and an electrical box and a hanger clip assembly. The invention is particularly directed to an electrical box having a bar hanger clip coupled to a wall of the electrical box for suspending or supporting the electrical box from a support, such as a cable.

BACKGROUND OF THE INVENTION

Lighting fixtures and other electrical devices are often supported below a ceiling such as by a grid ceiling having T-shaped bars and rails. The electrical box is often required to support the weight of the lighting fixture which is also supported by the ceiling grid. Additional support is often required to properly support the weight of the electrical fixture.

Mounting brackets and braces are often required to mount the electrical box to the ceiling grid that extends between two parallel grids or bars. The mounting braces are generally sufficiently strong to support the weight although the weight is then transferred to the ceiling grid. The ceiling grid must also be properly mounted and attached to the ceiling to support the weight of the lighting fixture. In some installations, a cable is coupled to the electrical box which is then attached to the ceiling to provide additional support for the ceiling grid and the electrical box.

Various devices have been proposed for mounting and supporting an electrical box during use. One example is disclosed in U.S. Pat. No. 8,309,849 to Dinh. This patent discloses an attachable supporting spacer for an electrical box. The spacer is a far side support member to support the electrical box and contact the opposing wall. The support spacer includes an upper body and a lower body. The lower body has a pair of legs or notches and that are inserted into holes in the rear wall of the electrical box. The upper body has a fastening tongue extending perpendicular to the plane of the upper body. The lower body is positioned against the rear wall of the electrical box with the tongues and inserted into the holes. The upper body is bent along the fold line between the upper and lower bodies so that the tongue 206 hooks onto the inner edge of the hole of the electrical box to hold the support in position. A spacer has an upper body and a lower body and neck portion extending between the upper body in the lower body. The upper body has a fastening tongue perpendicular to the surface of the upper body to fit within a fastening hole in the electrical box. The lower body has a leg with a notch to receive the bottom wall of the electrical box by a fastening hole. The fastening tongue is positioned in the fastening hole and the upper body is bent perpendicular to the lower body to fasten the spacer to the bottom wall of the electrical box.

U.S. Pat. No. 8,403,277 discloses an electrical box mounting bracket for mounting on a mounting bar. The bracket includes a tab that is inserted into a hole in the rear wall of the electrical box to align the bracket with mounting holes in the electrical box. A coupling screw extends through the rear wall of the electrical box for mating with the mounting bracket.

U.S. Pat. No. 2,512,188 discloses an outlet box support having an adjustable clamp member extending from the rear wall of the electrical box. The clamp member has a base that contacts the opposing wall to support the electrical box.

U.S. Pat. No. 4,326,284 discloses a fastener for an attaching electrical box to a steel bar. The bracket includes clip members that clip to the side walls of the electrical box and clip to the steel studs.

U.S. Pat. No. 4,898,357 to Jorgensen discloses an electrical box clip having an adjustable support member that extends from the rear wall of the electrical box to contact the opposing wall surface.

U.S. Pat. No. 5,484,076 to Petrushka discloses a loadbearing mounting bracket for hanging a light fixture and for connecting to a mounting rail from a ceiling grid system. The bracket is a one piece member attached to the rear wall of the electrical box by screws. The mounting bracket includes a slot for receiving a mounting rail. The upper ends of the bracket include holes for receiving supporting cables.

U.S. Pat. No. 6,389,658 to Fowler discloses a mounting clip for attaching an electrical box to a support or wall stud. The clip member includes spring biased legs for attaching to the sidewall of the electrical box.

U.S. Pat. No. 6,956,172 to Dinh discloses an adjustable outlet box assembly. The outlet box has a movable bracket that slides in a longitudinal direction with respect to the bracket for positioning the electrical box at the selected position relative to the wall surface.

U.S. Pat. No. 7,923,635 to Korcz discloses a mounting bracket with the far side support. The far side support lies flat against the wall and is bendable to an extended position to contact the opposing wall surface.

U.S. Patent Publication No. 2010/0288554 to Jafari discloses a support bracket for an electrical junction box. The bracket includes an extendable portion for extending to a length to contact the opposing surface.

While the previous devices have been suitable for their intended use, there is a continuing need in the industry for an improved support member for an electrical box.

SUMMARY OF THE INVENTION

The present invention is directed to a box hanger clip and to an electrical box assembly having the box hanger clip attached thereto. The invention is particularly directed to an electrical box having a bar hanger clip coupled to a surface of the box for mounting or suspending the electrical box from a support.

The box hanger clip of the invention can be produced separately and attached to the electrical box at the time of installation. Alternatively, the box hanger clip can be attached to the electrical box as a preassembled unit and shipped to the user in the assembled condition. The box hanger clip can be pivotally coupled to the electrical box to be folded or pivoted between a collapsed position and an extended upright position during use.

The box hanger clip is preferably formed of metal such as steel or other rigid material capable of coupling to the electrical box and supporting the weight of the electrical box and the electrical fixture attached to the electrical box. In one embodiment, the box hanger clip is cut from the sheet metal blank and folded to the end shape for attaching to the electrical box.

The box hanger clip of the invention can be coupled to the electrical box and folded against the wall of the electrical box during shipping and storage and pivoted to an upright position for coupling to a support to support the electrical box.

The box hanger clip of the invention has at least one coupling tab that can be inserted through an aperture in the electrical box for hooking and coupling the box hanger clip to the electrical box. In a preferred embodiment, the coupling tabs allow the box hanger clip to pivot flat against the wall of the electrical box and pivoted outwardly for coupling to the support.

The box hanger clip of the invention in one embodiment includes at least one stabilizing tab connected to a body of the box hanger clip. The stabilizing tab is bendable to an inclined angle with respect to a plane of the body to prevent pivoting movement of the body with respect to the electrical box and to support the box hanger clip in an upright position extending away from the wall of the electrical box. In one embodiment, the body of the box hanger clip has a stabilizing tab extending from opposite ends which can be folded in the same direction or in opposite directions with respect to each other to retain the box hanger clip in the upright position.

In another embodiment of the invention, two identical box hanger clips are coupled to the electrical box which can be folded flat against the wall of the electrical box during storage. The box hanger clips are then pivoted to an upright position so that the respective body of the box hanger clips are superimposed and extend away from the wall of the electrical box. The body of the box hanger clips include a coupling member such as an aperture for receiving a cable or other support structure for supporting the electrical box.

The various features and advantages of the invention are basically attained by providing a box hanger clip assembly having a first box hanger clip with a body having a bottom edge configured for contacting a wall of an electrical box, a top edge, a first side edge and a second side edge, where the body is configured for coupling the electrical box to a support. A first coupling tab is integrally formed with the bottom edge and extends substantially perpendicular to a plane of the body. The first coupling tab is configured for mating with an aperture in an electrical box. A stabilizing tab is coupled to the first side edge of the body by a fold line. The stabilizing tab is bendable about the fold line between a first position substantially parallel to the body and a second position at an inclined angle with respect to the body.

The features of the invention are further attained by providing an electrical box assembly comprising an electrical box and a first hanger clip. The electrical box has a rear wall, an open front side, and at least one side wall extending from the rear wall where the rear wall has a first aperture formed therein. The hanger clip has a body configured for coupling with a support structure, where the body has a bottom edge, a first side edge and a second side edge. At least one coupling tab extends from the bottom edge of the body in a direction substantially perpendicular to a plane of the body. The coupling tab is received in the aperture in the rear wall of the electrical box. A first stabilizing tab is coupled to the first side edge of the body for contacting the rear wall and supporting the first hanger clip in an upright position with respect to the rear wall.

The objects and features of the invention are further attained by providing a method for forming an electrical box assembly by inserting the coupling tab into an aperture in the rear wall of an electrical box. The coupling tab extends substantially perpendicular to a plane of the body of the first hanger clip where the body is oriented substantially perpendicular to a plane of the rear wall and the coupling tab engages an inner surface of the rear wall. A stabilizing tab is bent from a side edge of the body from a first position substantially parallel to a plane of the body to a second position at an inclined angle with respect to the plane of body and with respect to the coupling tab.

The various objects, advantages and salient features of the invention will become apparent from the following detailed description of the invention, which in conjunction with the annexed drawings disclose various embodiments of the invention.

BRIEF DESCRIPTION OF THE DRAWINGS

The following is a brief description of the drawings in which.

DESCRIPTION OF THE INVENTION

The invention is directed to box hanger clip and to an electrical box assembly that includes the box hanger clip. The box hanger clip of the invention is adapted for supporting the electrical box from a cable or other support. Electrical codes require the electrical box to be independently supported by mounting brackets or some other form of support. The hanger clip of the invention can be used in conjunction with a conventional electrical box and a box mounting bracket although the hanger clip can be used alone if desired to suspend the electrical box.

The box hanger clip of the invention can be attached to the electrical box at the time of installation for mounting the electrical box. In one embodiment of the invention, the hanger clip is preassembled with the electrical box for quick installation. The box hanger clip of the invention can be coupled directly to the electrical box where the box hanger clip is movable between a collapsed position for storage and shipping and an extended upright position during use.

Referring to the drawings, the electrical box hanger clip 10 of the invention is coupled to an electrical junction box 12. The electrical box 12 can be a standard electrical box having a rear wall 14 and one or more side walls 16 with various knock-outs 22 or pry-outs for forming access openings into the electrical box for electrical wiring. The electrical box 12 has an open front end 18 for receiving and mounting an electrical wiring device such as lighting device. Tabs 19 extend inwardly from the open front end 18 for mounting an electrical fixture, cover or bracket. The rear wall 14 is provided with a plurality of apertures 20. In the embodiment shown, the apertures 20 are formed in a straight line extending across the mid-section of the rear wall 14 along a first axis in a transverse direction bisecting the rear wall 14. As shown, a single aperture 20 is formed on each side of the center knock-out 22 aligned along a second axis perpendicular to the first transverse direction. The apertures generally have a circular shape and can conform generally to holes or apertures 20 commonly formed in an electrical box for mounting the electrical box to a support.

Figure 7:
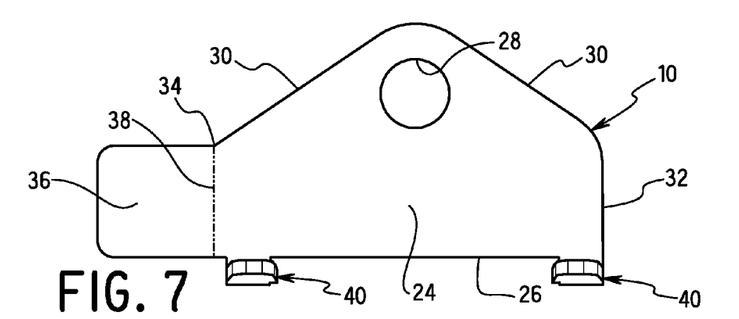
FIG. 7 is a front view of the box hanger clip showing the stabilizing tab in the first position.
Figure 8:
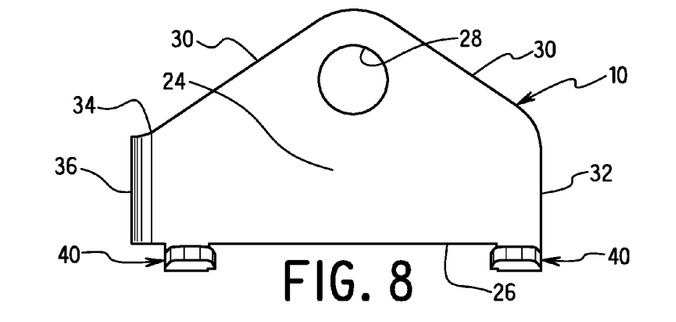
FIG. 8 is a front view of the box hanger clip showing the stabilizing tab in the bent position.
Figure 9:
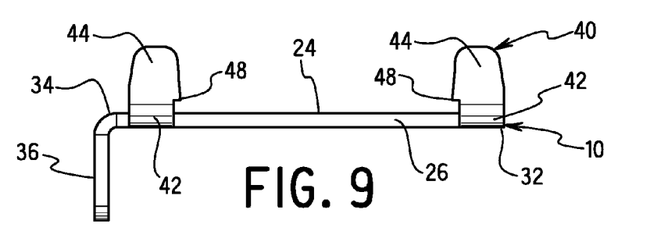
FIG. 9 is a bottom view of the box hanger clip of FIG. 8.
Figure 10:
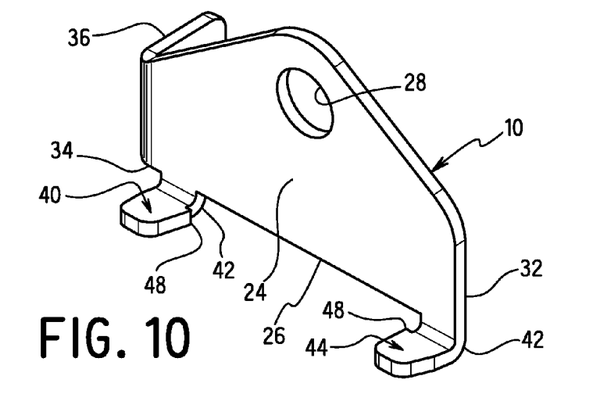
FIG. 10 is a perspective view of the box hanger clip of FIG. 8.

The box hanger clip 10 in a first embodiment of the invention shown in FIG. 7 is formed from a blank of sheet metal or other rigid material sufficient to support the weight of the electrical box 12 and the electrical device mounted to the electrical box. The blank is folded to form the box hanger clip 10 as shown in FIG. 10.

Figure 1:
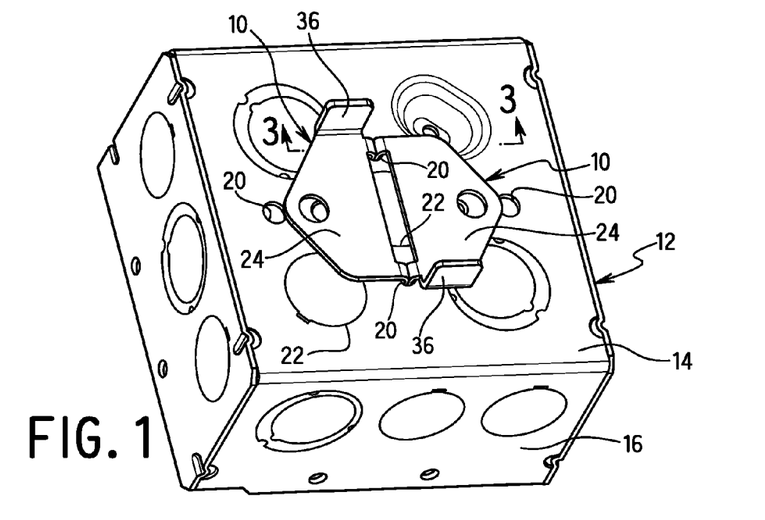
FIG. 1 is a perspective rear view of the first embodiment showing two box hanger clips attached to the electrical box.
Figure 4:
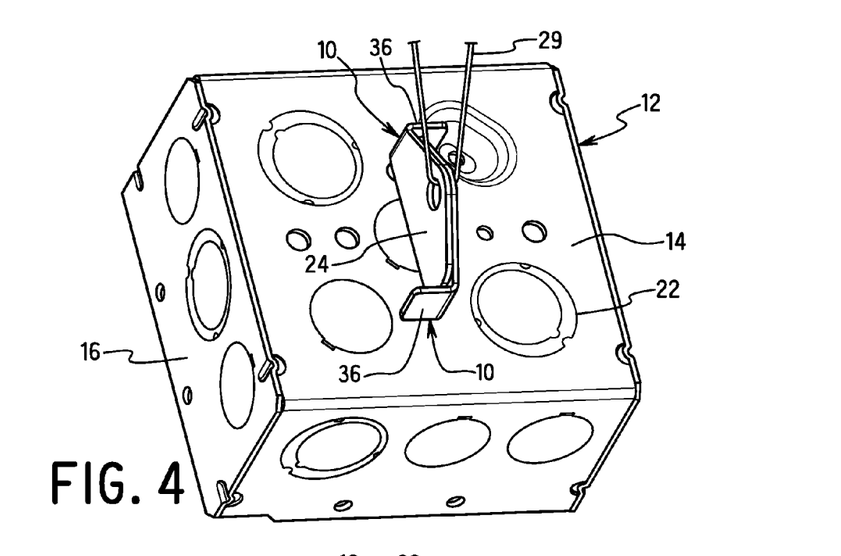
FIG. 4 is a perspective rear view showing the box hanger clips folded to the upright operating position.
Figure 5:
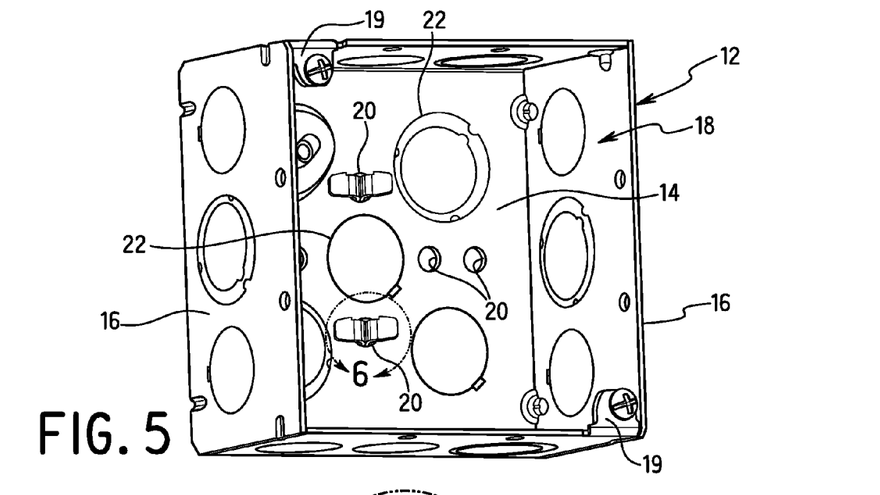
FIG. 5 is a front perspective view showing the coupling tabs engaging the inner surface of the electrical box.

The box hanger clip 10 in one embodiment is configured to lie against the rear wall of the electrical box 12 in a preassembled condition for packaging and shipping to the installation site as shown in FIG. 1. The box hanger clip 10 is then moved to a position perpendicular to the plane of the rear wall 14 to the extended position shown in FIG. 4 for use in hanging the electrical box.

In the embodiment of FIGS. 1-10, two hanger clips 10 can be used by coupling the clips 10 to the rear wall of the electrical box 12 for supporting the electrical box during use. In other embodiments, a single hanger clip 10 can be used. In the embodiment shown, the box hanger clip 10 is coupled to the rear wall of the electrical box 12. In other embodiments, the box hanger clip 10 can be coupled to a side wall, top wall or other suitable surface of the electrical box. Each of the clips 10 as shown in FIG. 7 have a body 24 with a straight bottom edge 26 for mating with the rear wall 14 of the electrical box 12. In the embodiment shown, the body 24 has a substantially flat, planar configuration. The body 24 has an aperture 28 or other coupling member for receiving a cable (not shown) or other supporting device for suspending the electrical box 12. The electrical box 12 can also be coupled to a mounting bracket (not shown) that can be attached to a ceiling joist or other support structure for supporting the electrical box and the electrical device. In the embodiment shown, the body 24 has inclined top edges 30 that converge to an apex. In other embodiments, the top edge 30 can be straight and substantially parallel to the bottom edge 26.

The body 26 has a first side edge 32 and a second side edge 34 opposite the first side edge 32 that extend between the top edge and the bottom edge 26. In the embodiment shown, the side edges extend substantially perpendicular to the bottom edge 26. In other embodiments, the side edges 32 and 34 can be inclined with respect to the bottom edge 26. A stabilizing tab 36 extends from the side edge 34 and is coupled to the side edge 34 by a fold line 38. The tab 36 in one embodiment has a height corresponding substantially to the height of the side edge 34. In preferred embodiments, the tab 36 has a height and a width sufficient to support and stabilize the hanger clip 10 with respect to the electrical box as discussed herein. This is in the embodiment shown, the second side edge 32 defines a free end of the body 26.

The bottom edge 26 is provided with at least one and preferably two spaced-apart coupling tabs 40. The coupling tabs 40 extend substantially perpendicular to the plane of the body 24 and are configured for mating with the apertures 20 in the electrical box. Each coupling tab 40 has a first leg 42 that extends substantially parallel to the body 24 away from the bottom edge 26 and a second leg portion 44 extending perpendicular to the first leg portion 42. The second leg 44 of the coupling tab 40 has a projecting hook 48 spaced from the body 26. The first leg 42 has a length to space the second leg 44 of the coupling tab 40 a distance sufficient so that the coupling tab 40 can extend through the aperture 20 in the rear wall of the electrical box and the projecting hook 48 can hook onto the inner surface of the wall around the edge of the respective aperture 20. The first leg 42 has a length to pass through the aperture 20 in the retracted position shown in FIGS. 1-3. The hook 48 forms a bar or retainer member to couple the box clip to the electrical box. The hook 48 is spaced from the first leg 42 and the plane of the body 24 a distance complementing the thickness of the wall of the electrical box to hook to the inner face of the wall 14 while enabling the body 24 2 fold substantially flat against the wall 14 as shown in FIG. 1.

Figure 2:
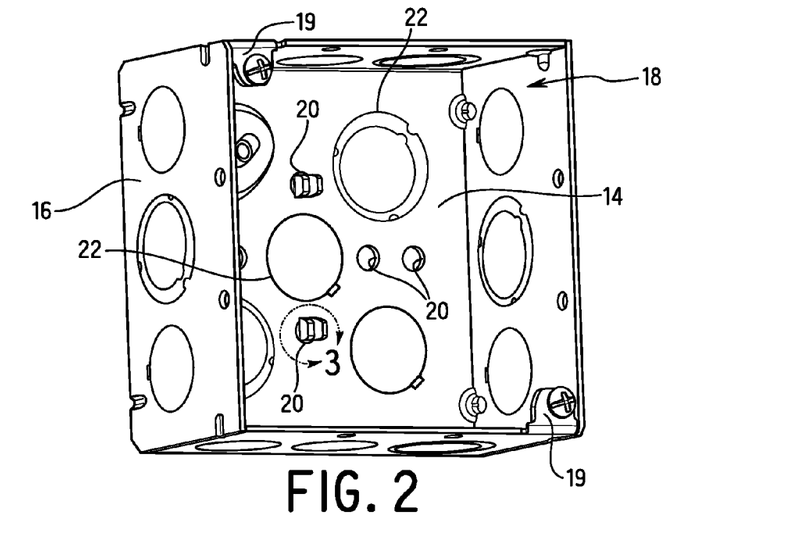
FIG. 2 is a perspective front view of the electrical box of FIG. 1.
Figure 3:
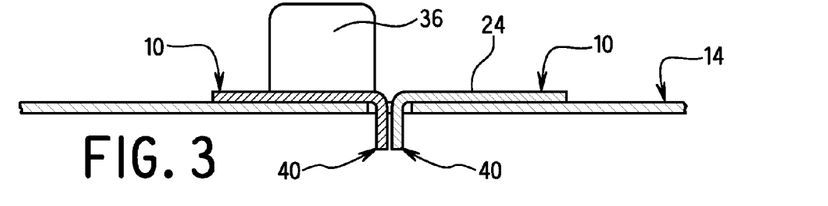
FIG. 3 is a cross-sectional view showing the coupling tabs extending through the aperture in the electrical box taken along line 3-3 of FIG. 1.

In the embodiment shown in FIGS. 1-10, two clips 10 are coupled to the rear wall 14 of the electrical box 12 by inserting the coupling tabs 40 through the aperture 20 as shown in FIGS. 1-3 so that the body 24 of the hanger clips 10 can lie flat against the rear wall 14 of the electrical box for packaging and shipping. The coupling tabs 40 pass through the respective aperture 20 where the projecting hook 48 engages the inner edges of the aperture 20 and the inner surface of the rear wall 14. In one embodiment of the invention, the hooks 48 of the coupling tabs 40 have a width slightly greater than the diameter of the apertures 20 so that the projecting hooks 48 are forced through the apertures and the projecting hooks 48 couple the hanger clips 10 to the rear wall of the box and prevent separation of the hanger clips 10 from the rear wall 20 as shown in FIGS. 1-3. In one embodiment, the stabilizing tab 36 initially can be in the flat position shown in FIG. 7 parallel to the body 26. The tabs 36 can be bent about the fold line 38 to the position shown in FIG. 1 perpendicular to the plane of the body 24 by the installer at the time of use. In one embodiment, the hanger clips 10 are formed to the shape shown in FIGS. 8-10 before coupling to the electrical box.

Figure 6:
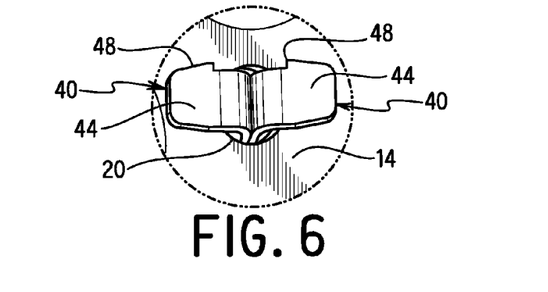
FIG. 6 is an enlarged perspective view showing the coupling tabs engaging the inner surface of the electrical box.

In use, the hanger clips 10 can be coupled to the electrical box at the time of manufacture as shown in FIG. 1 where the hanger clips lie flat against the rear wall of the electrical box for shipping. The stabilizing tabs can be parallel to the plane of the body of the hanger clip to lay flat against the rear wall or can be folded to the position shown in FIG. 1. The box hanger clip is then pivoted to an upright position perpendicular to the rear wall 14 to the position shown in FIG. 4. In this position the stabilizing tabs 36 of each hanger clip 10 are oriented to extend in opposite directions and have the respective body 24 lying against each other. The coupling tabs 40 as shown in FIG. 6 pivot to a position substantially parallel to and in contact with the inner surface of the rear wall 14 to prevent removal from the hanger clips from the aperture 20 in the rear wall 14 of the electrical box 12 and to support the electrical box 12 by the hanger clips 10. A cable 29, wire or other hanger support can then be coupled to the aperture 28 or other coupling member in the body for supporting the electrical box 12. In the embodiment shown, the cable 29 extends between the hanger clip 10 and the ceiling.

Figure 15:
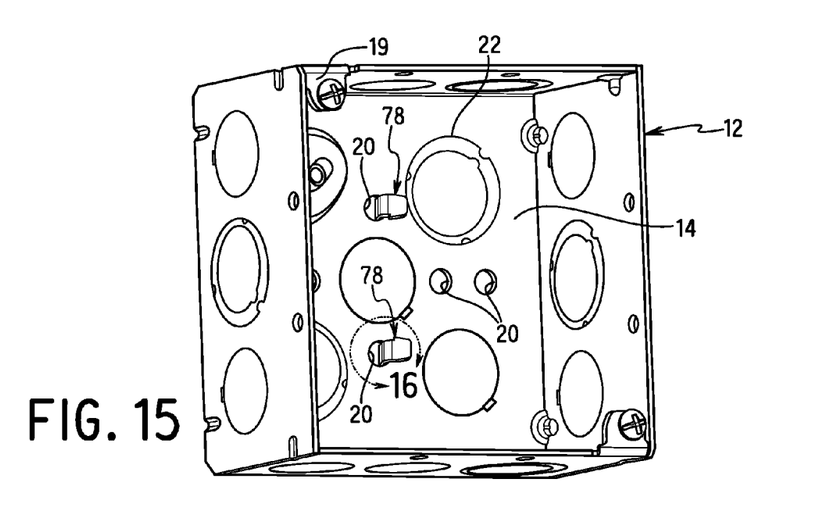
FIG. 15 is a front perspective view showing the coupling tabs engaging the inner surface of the electrical box.
Figure 16:
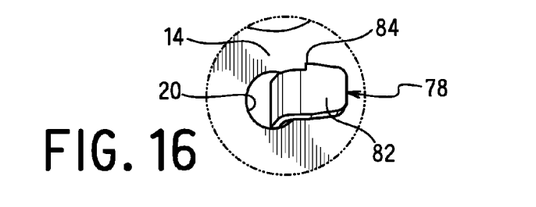
FIG. 16 is an enlarged view showing the coupling tabs engaging the inner surface of the electrical box.
Figure 17:
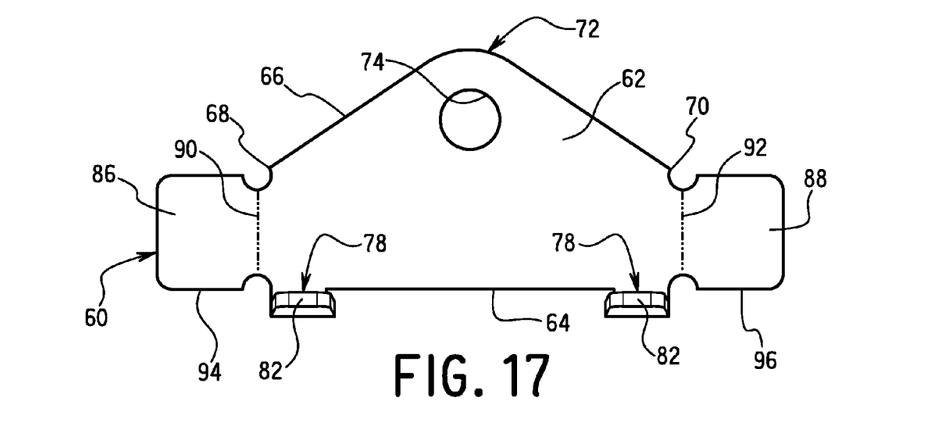
FIG. 17 is a front view of the box hanger clip of FIG. 11.
Figure 18:
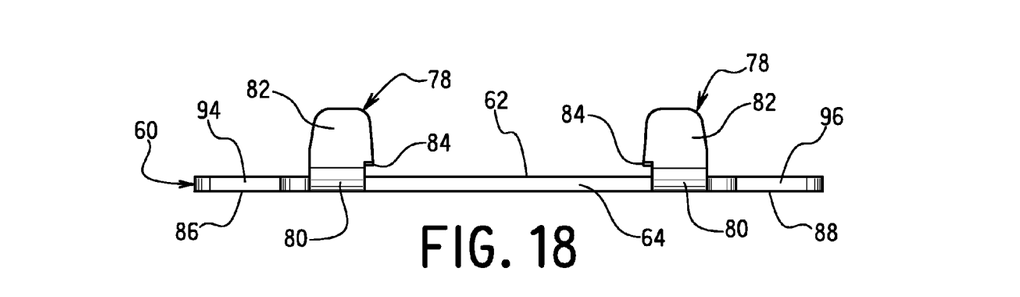
FIG. 18 is a bottom view of the box hanger clip of FIG. 17.
Figure 19:
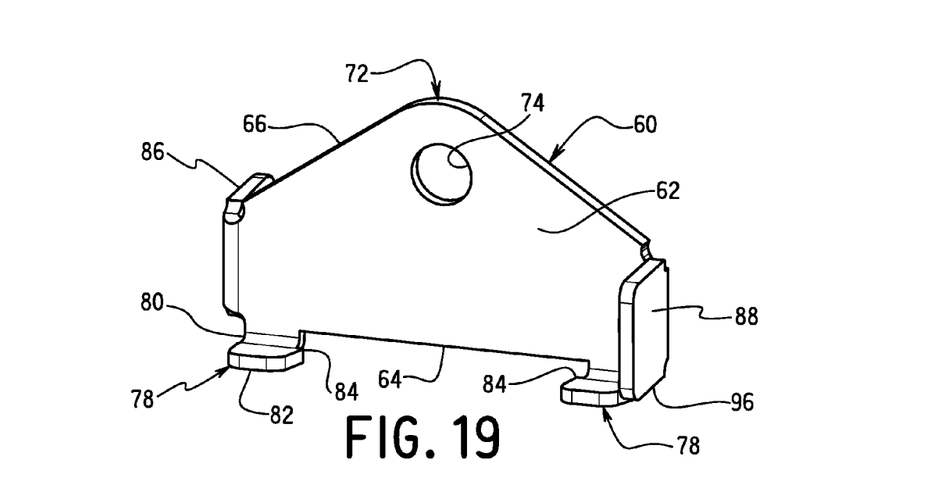
FIG. 19 is a perspective view of the box hanger clip of FIG. 17.

In the embodiment of FIGS. 11-19, a single hanger clip 60 is used to support the electrical box 12. Referring to FIGS. 17-19, the hanger clip 60 is formed from a sheet metal blank that is cut or punched to the finished shape for supporting the electrical box 12. The hanger clip 60 has a body 62 with a bottom edge 64, a top edge 66, a first side edge 68 and a second side edge 70 opposite the first side edge 68. In the embodiment shown, the side edges extend between the top edge 66 and bottom edge 64 of the body 62. The top edge 66 in the embodiment shown has inclined surfaces that converge to an apex 72. An aperture 74 is provided in the body 62 near the apex 72 for receiving a cable 76 or other support for suspending the electrical box 12.

The bottom edge 64 forms a substantially straight surface for mating with the wall of the electrical box 12 as shown. A coupling tab 78 is coupled to the bottom edge 64 of the body 62 in a manner as the previous embodiment. In the embodiment shown, two spaced-apart coupling tabs 78 are provided for coupling the hanger clip 60 to the electrical box. The coupling tabs 78 have a first leg 80 extending from the bottom edge 64 of the body 62 and a second leg 82 extending substantially perpendicular to the first leg 80. The first leg 80 has a length corresponding substantially to the thickness of the wall of the electrical box 12 so that the coupling tab 78 can extend through an aperture 20 in the electrical box 12 with a top face of the second leg 82 contacting the inner surface of the wall 14 of the electrical box 12 when the body 62 of the hanger clip 60 is oriented substantially perpendicular to the plane of the wall of the electrical box. The second leg 82 has a projecting hook 84 for coupling with the aperture 20 in the wall of the electrical box as in the previous embodiment. The hook 84 preferably has a width to enable the second leg 82 to penetrate the aperture 20 and couple the hanger clip 60 to the electrical box 12. In a preferred embodiment, the two spaced apart coupling tabs 78 extend substantially perpendicular to the plane of the body 62 from the same side of the body 62 and are substantially parallel to each other. The coupling tabs 78 are spaced apart a distance corresponding to the spacing between the apertures 20 in the wall 14 of the electrical box 12.

Figure 14:
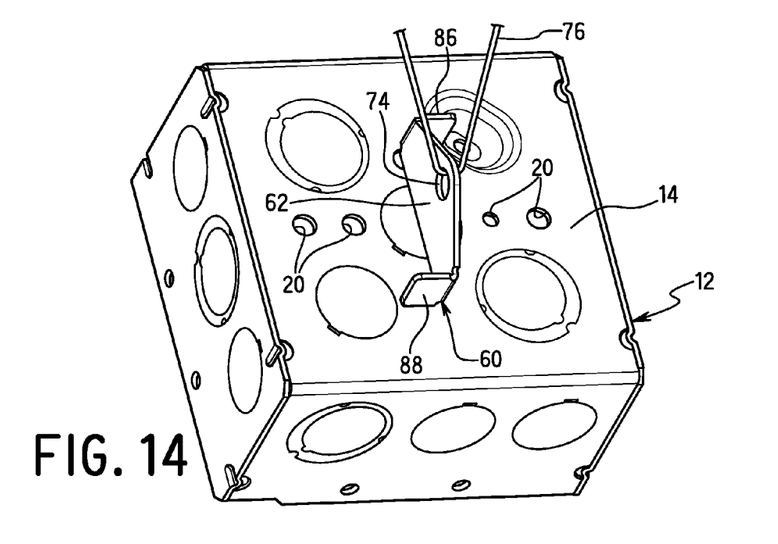
FIG. 14 is a rear perspective view showing the box hanger clip pivoted to the upright position and the stabilizing tabs stabilizing position.

A first stabilizing tab 86 is coupled to the first side edge 68 of the body and a second stabilizing tab 88 is coupled to the second side edge 70 of the body 62. In preferred embodiments, the stabilizing tabs 86 88 are integrally formed with the body 62 and connected to the body 62 by fold lines 90 and 92, respectively, so that the stabilizing tabs 86 and 88 are bendable between a first position substantially parallel to the plane of the body as shown in FIGS. 11 and 17 and second position where the stabilizing tabs 86 and 88 are at an inclined angle with respect to the plane of the body 60 as shown in FIGS. 14 and 19.

In one preferred embodiment, the fold lines 90 and 92 are substantially perpendicular to the bottom edge 64 of the body 62. In other embodiments, the fold lines can be formed at an incline with respect to the bottom edge 64 so long as the bottom edges 94 and 96, respectively of the stabilizing tabs 86 and 88 are able to contact the wall 14 of the electrical box 12 when the stabilizing tabs are bent along the respective fold lines. Each of the stabilizing tabs 86 and 88 in the embodiment shown have a bottom edge aligned with the bottom edge of the body so that the bending the stabilizing tabs along the fold line enables the bottom edge of the stabilizing tabs to contact the surface of the wall of the electrical box at any position of the stabilizing tab with respect to the body. In alternative embodiments, the fold line and the bottom edge of the stabilizing tabs can be inclined and oriented so that bending of the coupling tabs enables the coupling tab to contact the wall of the electrical box during use.

Figure 11:
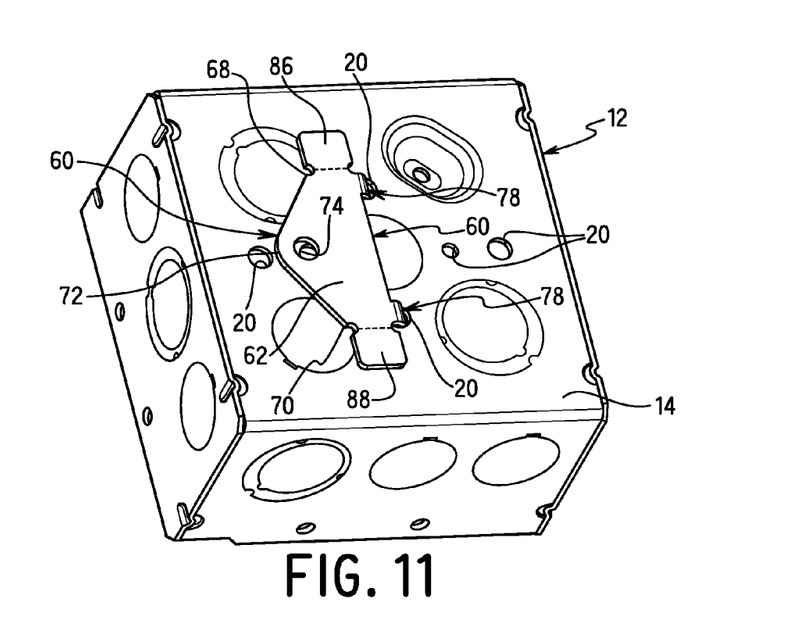
FIG. 11 is a perspective view of the box hanger clip attached to the electrical box and a second embodiment of the invention.
Figures 12, 13:
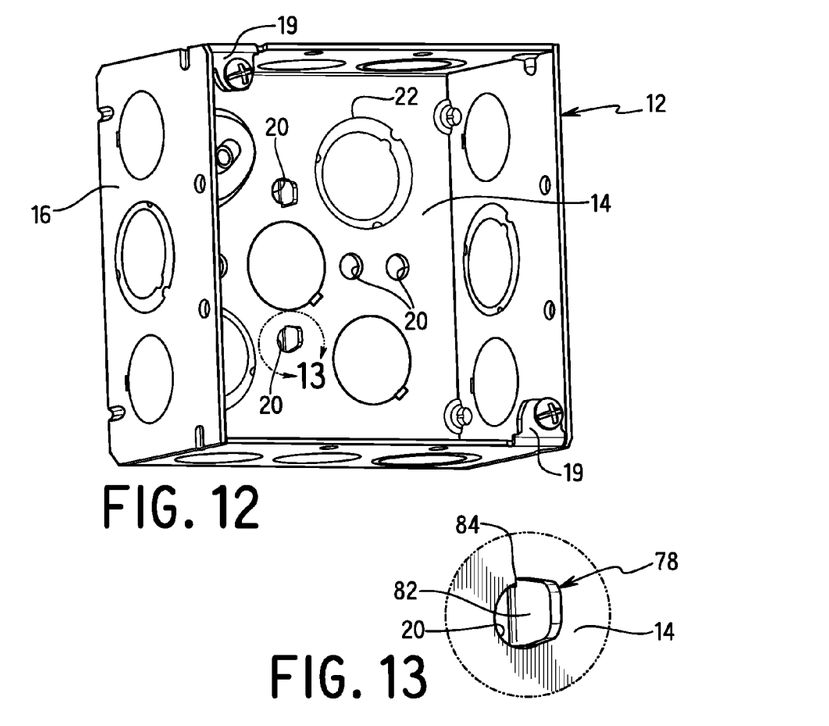
FIG. 12 is a front perspective view showing the coupling tabs extending through the aperture in the electrical box.
FIG. 13 is an enlarged view showing the coupling tabs extending through the aperture in the electrical box.

Referring to FIG. 11, the hanger clip 60 is coupled to the rear wall 14 of the electrical box 12 with the coupling tabs 78 extending through the respective apertures 20 in the rear wall. The hanger clip 60 can lay flat against the rear wall 20 during packaging and shipping to reduce the volume during shipping. In use, the hanger clip 60 is rotated or pivoted upward to the upright position substantially perpendicular to the rear wall 14 so that the coupling tabs 78 contact the inner surface of the rear wall 14 of the electrical box as shown in FIGS. 15 and 16. The stabilizing tabs 86 and 88 are then bent out of the plane of the body 62 to retain the body 62 in the upright position with respect to the wall of the electrical box. In one preferred embodiment the stabilizing tabs are folded in opposite directions perpendicular to the plane of the body 62 to the position shown in FIGS. 14 and 19 to stabilize the clip 60 and prevent the body 62 of the hanger clip from pivoting or rocking with respect to the wall 14 of the electrical box 12. The stabilizing tabs 86 and 88 can be folded in the same direction as the coupling tabs 78 to prevent the hanger clip from pivoting to the position shown in FIG. 11. A cable or other support is then passed through the aperture 74 in the body 62 for supporting the electrical box 12 as in the previous embodiment.

While various embodiments of the invention have been shown to illustrate the invention, it will be understood that various changes and modifications can be made without departing from the scope of the invention.

What is claimed is:

1. A box hanger clip assembly comprising:
   a first hanger clip having a body with a bottom edge configured for coupling to a wall of an electrical box, a top edge and first and second opposite side edges, said body being configured for coupling the electrical box to a support;
   a first coupling tab integrally formed with said bottom edge and extending substantially perpendicular to a plane of said body, said first coupling tab being configured for mating with an aperture in the electrical box: and
   a stabilizing tab coupled to said first side edge of said body by a fold line, said stabilizing tab being bendable about said fold line between a first position substantially parallel with said body and a second position at an inclined angle with respect to said body.

2. The box hanger clip assembly of claim 1, further comprising
   a second coupling tab integrally formed with said bottom edge and extending perpendicular to the plane of said body in substantially the same direction of said first coupling tab, said second coupling tab configured to mate with a second aperture in the electrical box.

3. The box hanger clip assembly of claim 1, further comprising
   a second stabilizing tab coupled to said second side edge of said body by a fold line, said second stabilizing tab being foldable between a first position substantially parallel to said body and a second position at an inclined angle with respect to said body in a direction opposite said first stabilizing tab.

4. The box hanger clip assembly of claim 1, wherein said coupling tab has a hook shaped end to couple with the aperture in the electrical box.

5. The box hanger clip assembly of claim 1, further comprising
 a second hanger clip having a body with a bottom edge, a top edge, a first side edge and a second side edge, a first coupling tab integrally formed with said bottom edge of said body and being configured for being received in the aperture in the electrical box, and
 where said body of said first hanger clip is substantially parallel to said body of said second hanger clip, and said first coupling tab of said first hanger clip extends in a first direction and said first coupling tab of said second hanger clip extends in a second direction.

6. The box hanger clip assembly of claim 5, wherein
 said second hanger clip has a stabilizing tab coupled to said first side edge of said body and is bendable about a fold line between a first position parallel to said body and a second position at an inclined angle with respect to said body.

7. An electrical assembly comprising:
 an electrical box having a rear wall, an open front side and at least one side wall extending from said rear wall, said electrical box having a first aperture formed therein; and
 a first hanger clip having a body configured for coupling with a support structure, said body having a bottom edge, a first side edge, and a second side edge, a first coupling tab extending from said bottom edge of said body in a direction substantially perpendicular to a plane of said body, said first coupling tab being received in said first aperture of said electrical box, and a first stabilizing tab coupled to said first side edge of said body for contacting said electrical box and supporting said first hanger clip in an upright position with respect to said electrical box.

8. The assembly of claim 7, wherein
 said stabilizing tab is bendable between a first portion parallel to said body and a second position substantially perpendicular to said body.

9. The assembly of claim 7, further comprising
 a second stabilizing tab coupled to a second edge of said body opposite said first stabilizing tab, said second stabilizing tab being bendable between a first position parallel to said body and a second position substantially perpendicular to said body.

10. The assembly of claim 7, further comprising
 a second hanger clip having a body configured for coupling with a support structure and for aligning with said body of said first hanger clip, a first coupling tab extending from a bottom edge of said body in a direction substantially perpendicular to a plane of said body, said at least one coupling tab being received in said aperture in said electrical box.

11. The assembly of claim 10, wherein
 said first coupling tab of said first hanger clip extends in a first direction, and said first coupling tab of said second hanger clip extends in a second direction.

12. The assembly of claim 11, wherein
 said first hanger clip has a second coupling tab extending from said bottom edge of said body in a direction substantially parallel to said first coupling tab and being received in a second aperture in said electrical box, said second hanger clip having a second coupling tab extending from said bottom edge of said body in a direction substantially parallel to said first coupling tab and received in said second aperture.

13. The assembly of claim 11, wherein
 said body of said first hanger clip has an aperture, and said body of said second hanger has an aperture aligned with said aperture in said first hanger clip, said apertures configured for receiving a support member for suspending said electrical box.

14. The assembly of claim 10, wherein
 said second hanger clip has a stabilizing tab extending from a side edge of said body, wherein said stabilizing tab is bendable between a first position parallel to said body and a second position at an inclined angle with respect to the plane of said body.

15. The assembly of claim 14, wherein
 said first stabilizing tab of said first hanger clip extends in a first direction, and said first stabilizing tab of said second hanger clip is bendable in a second direction.

16. The assembly of claim 7, wherein
 said coupling tab of said first hanger clip has a hook shaped end configured for retaining said coupling tab in said first aperture.

17. The assembly of claim 7, wherein
 said first stabilizing tab extend from said body in a direction opposite to said coupling tab.

18. A method of forming an electrical box assembly, comprising
 inserting a coupling tab of a first box hanger clip into an aperture in a rear wall of an electrical box, said coupling tab extending substantially perpendicular to a plane of a body of the first hanger clip, and orienting said body substantially perpendicular to a plane of said rear wall where the coupling tab engages an inner surface of said rear wall, and
 bending a stabilizing tab on a side edge of the body of the first hanger clip from a first position substantially parallel to the plane of the body to a second position at an inclined angle with respect to the plane of the body in a direction opposite to the coupling tab.

19. The method of claim 18, further comprising
 inserting a coupling tab of the second hanger clip into the aperture in the rear wall of the electrical box, the coupling tab extending substantially perpendicular to a plane of the body of the hanger clip an engaging the inner surface of the rear wall, and
 bending a stabilizing tab on a side edge of the body from the first position substantially parallel to a plane of the body to a second position at an inclined angle with respect to the plane of the body in a direction opposite to the coupling tab.

20. An electrical assembly comprising:
 an electrical box having a rear wall, an open front side and at least one side wall extending from said rear wall, said electrical box having a first aperture formed therein; and
 a first hanger clip having a body configured for coupling with a support structure, said body having a bottom edge, a first side edge, and a second side edge, a first coupling tab extending from said bottom edge of said body and being received in said first aperture of said electrical box;
 a second hanger clip having a body configured for coupling with a support structure, said body of said second hanger clip having a bottom edge, a first side edge, and a second side edge, a first coupling tab extending from said bottom edge of said body and being received in said first aperture of said electrical box, wherein said first hanger clip and second hanger clip are movable between a first position and a second position, where said body of said first hanger clip and said body of said second hanger clip extend away from said first aperture in said second position.

21. The electrical box assembly of claim 20, wherein
said first aperture is in said rear wall of said electrical box,
and said body of said first hanger clip in the first position lies against said rear wall and said body of said first hanger clip in the second position extends away from said rear wall, and
said body of said second hanger clip in the first position lies against said rear wall and said body of said second hanger clip in the second position extends away from said rear wall.

22. The electrical box assembly of claim 21, wherein
said first hanger clip has a first stabilizing tab coupled to said first side edge of said body for contacting said electrical box and supporting said first hanger clip in an upright position with respect to said electrical box; and
said second hanger clip has a first stabilizing tab coupled to said first side edge of said body for contacting said electrical box and supporting said second hanger clip in an upright position with respect to said electrical box.

\* \* \* \* \*